(12) United States Patent
Schluter (10) Patent No.: US 11,479,964 B2
(45) Date of Patent: Oct. 25, 2022

(54) RAIL PROFILE WITH ATTACHMENT MECHANISM AND RELATED METHODS

(71) Applicant: Schluter Systems L.P., Plattsburgh, NY (US)

(72) Inventor: Werner Schluter, Iserlohn (DE)

(73) Assignee: Schluter Systems L.P., Plattsburgh, NY (US)

( * ) Notice: Subject to any disclaimer, the term of this patent is extended or adjusted under 35 U.S.C. 154(b) by 546 days.

(21) Appl. No.: 16/682,750

(22) Filed: Nov. 13, 2019

(65) Prior Publication Data

US 2020/0340236 A1 Oct. 29, 2020

(30) Foreign Application Priority Data

Apr. 24, 2019 (DE) .................... 20 2019 102 305.8
May 16, 2019 (DE) .................... 20 2019 102 754.1

(51) Int. Cl.
*E04B 1/58* (2006.01)

(52) U.S. Cl.
CPC ........ *E04B 1/58* (2013.01); *E04B 2001/5881* (2013.01)

(58) Field of Classification Search
CPC ........ A47K 3/281; A47K 3/282; A47K 10/10; A47K 17/022; A47K 2201/02; E04B 1/58; E04B 2001/5881; E04B 13/083; E04B 19/062; E04B 19/065; F16B 7/0466
USPC ...................................................... 403/375
See application file for complete search history.

(56) References Cited

U.S. PATENT DOCUMENTS

| 2,893,676 | A | * | 7/1959 | Connors | ................. | A47K 10/10 |
| | | | | | | D6/540 |
| 2,928,512 | A | * | 3/1960 | Slater | .................... | F16B 7/0446 |
| | | | | | | 403/22 |
| 4,040,228 | A | * | 8/1977 | Skubic | .................. | E04B 1/4107 |
| | | | | | | 411/302 |
| 4,948,313 | A | * | 8/1990 | Zankovich | ............ | F16B 37/045 |
| | | | | | | 411/85 |
| 8,251,329 | B2 | * | 8/2012 | Suciu | .................. | G09F 15/0018 |
| | | | | | | 40/611.12 |
| 11,103,109 | B2 | * | 8/2021 | Schluter | ................. | A47K 10/10 |
| 2004/0231270 | A1 | * | 11/2004 | Collins | ................. | E04B 1/4178 |
| | | | | | | 52/506.01 |

(Continued)

FOREIGN PATENT DOCUMENTS

CN 102469898 A * 5/2012 ........... A47K 17/022
WO WO 90/09135 8/1990

*Primary Examiner* — James M Ference
(74) *Attorney, Agent, or Firm* — Jason Jones (57) ABSTRACT

A profile system (1) for fastening objects to a room wall provided with a plate covering comprises at least one elongated rail profile (2), which extends in a longitudinal direction (L) and has a constant cross-section, and at least one plug element (3), which is designed to be fastened directly and detachably to the rail profile (2) in a plug-in manner. The rail profile (2), viewed in cross-section, has a substantially rectangular base section (6), whose depth (T) is adapted to the thickness of the plate covering and which is provided on its front side with a receiving groove (7) extending in the longitudinal direction (L) with a groove opening (9) accessible from the outside, and at least one fastening leg (13) which adjoins the rear side of the base section (6) substantially flush and projects outwards from the base section (6).

11 Claims, 11 Drawing Sheets

(56) References Cited

U.S. PATENT DOCUMENTS

| | | | |
|---|---|---|---|
| 2007/0257058 A1* | 11/2007 | Ophardt | A47K 5/12 222/129 |
| 2011/0147553 A1* | 6/2011 | Ostermeier | F16B 5/125 24/304 |
| 2011/0253859 A1* | 10/2011 | Ostermeier | F24S 25/632 248/223.41 |
| 2012/0273644 A1* | 11/2012 | Lin | H04M 1/04 248/397 |
| 2015/0316086 A1* | 11/2015 | Urban | F16B 7/0473 29/446 |
| 2020/0170453 A1* | 6/2020 | Schluter | A47B 95/008 |
| 2020/0340236 A1* | 10/2020 | Schluter | A47K 3/282 |

* cited by examiner

RAIL PROFILE WITH ATTACHMENT MECHANISM AND RELATED METHODS

PRIORITY CLAIM

Priority is claimed of and to German Patent Application Serial No. 20 2019 102 305.8, filed Apr. 24, 2019, and German Patent Application Serial No. 20 2019 102 754.1, filed May 16, 2019, each of which is hereby incorporated herein by reference in its entirety.

DESCRIPTION

The present invention relates to a profile system for fastening objects to a room wall provided with a plate covering, comprising at least one elongated rail profile, which extends in a longitudinal direction and has a constant cross-section, and at least one plug element, which is designed to be fastened directly and detachably to the rail profile in a form-fitting manner.

Profile systems of the type mentioned at the beginning are known in the state of the art in a wide variety of embodiments. The rail profile is mounted on a wall, whereupon the at least one plug element can be detachably fastened to the rail profile by creating a form fit. A wide variety of objects can be mounted or fastened to the plug elements, such as shelves, tool holders or the like to name just a few examples. A problem with the known profile system is often that the rail profile is to be fastened to the wall with screws which require drilling holes. This is in particular undesirable if the wall is plate-covered, for example in the form of tiles, as it is difficult to fill the holes in the case of disassembly in such a way that they are no longer visible. If the wall is a tiled shower wall in which a surface seal is arranged between the wall and the tiles, it is not possible to install the rail profile without damaging the surface seal. A further disadvantage is that in many profile systems, the plug elements in the assembled state, apart from the form-fitting engagement, usually only support themselves selectively or linearly on the rail profile or on the wall. Correspondingly, the forces acting on the wall are only introduced very locally into the wall. This means that the load that can be taken up by the profile system is comparatively low. Accordingly, such profile systems can only be used to a limited extent.

Based on this state of the art, one of the tasks of this invention is to create a profile system of the type mentioned above with an improved structure.

To solve this problem, the present invention creates a profile system of the type mentioned above, in which the rail profile, viewed in cross-section, has a substantially rectangular base section, whose depth is adapted to the thickness of the plate covering and which is provided on its front side with a receiving groove extending in the longitudinal direction with a groove opening accessible from the outside, and at least one fastening leg which adjoins the rear side of the base section substantially flush and projects outwards from the base section, and wherein the plug element has a holding section, in particular a plate-shaped holding section, and an elongatedly formed connecting section fastened to the holding section and extending in the longitudinal direction, the connecting section comprising at least one bar extending outwards from the holding section and a head section arranged at the free end of the bar, the head section being designed in such a way, that it can be inserted through the groove opening into the receiving groove of the rail profile in a first swivel position of the plug element with respect to a swivel axis extending in the longitudinal direction and can be locked by swiveling the plug element about the swivel axis into a second swivel position within the receiving groove, and the profile system comprises at least one load-bearing element which, on its substantially flat rear side, is provided with a groove which is open at the bottom, closed at the top and has undercuts laterally, the dimensions of the groove being adapted to the holding section of the plug element in such a way that the load-bearing element can be pushed from above onto the locked holding section in a form-fitting manner and, in this state, bears flat against the plate covering, and a bath utensil is fastened to the front side of the load-bearing element. The design of the rail profile is advantageous in that it can be integrated into the tiling when tiling a wall by embedding at least one fastening leg in the tile adhesive or thin-bed mortar used for laying the plate covering. Accordingly, no screws are required to fasten the rail profile, which is why its installation does not impair an existing surface seal. In addition, the upper side of the at least one fastening leg is covered by the tile adhesive and the plate covering, which results into a very stable arrangement. A very tidy appearance is also achieved. The provision of a load-bearing element that can be pushed or plugged onto the holding section of the plug element is advantageous in that the plug element is fixed in its second position by the load-bearing element held on it so that it cannot accidentally come loose. On the other hand, the load is transferred very well into the wall via the load-bearing element which lies flat against the wall. Accordingly, very high loads can be absorbed by the profile system according to the invention.

Preferably, the receiving groove, viewed in cross-section, describes a circular arc extending over at least 200° and having a first radius $R_1$, wherein the groove opening has a predetermined groove width, and wherein the head section has a substantially cylindrical circumferential surface, which, viewed in cross-section, describes a circular arc having the radius $R_2$, which is equal to or slightly smaller than the radius $R_1$, the maximum distance between a circular chord delimiting the circular arc of the circumferential surface and the circumferential surface being slightly smaller than the groove width. Thanks to this design, the plug element can easily be inserted into the receiving groove of the rail profile and fastened to it by means of a swivel movement in a form-fitting manner.

Undercut recesses are advantageously provided on the rear side and/or on the upper side and/or on the underside of the base section of the rail profile. An adhesive or a mortar, with which the rail profile is fastened to a wall, can claw itself into such recesses.

According to an embodiment of the present invention, a recess is provided in the corner region between the underside and the front side of the base section and/or in the corner region between the front side and the upper side of the base section and/or in the corner region between the upper side and the rear side of the base section, the recess defining a grout chamber to receive grout. The recess is advantageously provided with an undercut which is positioned and designed in such a way that grout introduced into the recess can claw into it.

According to the invention, the fastening leg may be provided with a plurality of passage openings, which are preferably uniformly spaced apart from one another in the longitudinal direction. An adhesive or mortar can pass through such passage openings to fix the rail profile to a wall, ensuring a secure hold.

Preferably, the rail profile and the at least one plug element are made of metal, in particular of aluminum or stainless steel, which provides a very good strength and corrosion resistance.

The holding section of the plug element is advantageously plate-shaped. Many different objects can be attached to such a plate-shaped holding section so that the plug element can be used in a very flexible way.

The bar of the connecting section preferably projects at an angle between 100° and 110°, in particular upwards from the holding section. Such an oblique connecting section facilitates the insertion of the head section into the receiving groove.

According to one embodiment of the present invention, the head section is provided with a receiving deepening extending in the longitudinal direction, into which a rubber lip serving for tolerance compensation is inserted. By means of such a rubber lip, deviations between the radii $R_1$ and $R_2$ can be compensated to ensure a good fit of the head section in the receiving groove.

Preferably, the at least one load-bearing element is made of metal or plastic. According to the invention, the bath utensil can be a high-stress utensil, such as a holding bar, as it is arranged in the area of showers, bath tubes and toilets as a personal support, or a shower seat. Of course, it can also be less-used utensils, such as a shower tray, a towel holder or the like.

Further features and advantages of the present invention become clear by the following description with reference to the enclosed drawing. There is/are FIG. 1 a perspective view of a rail profile of a profile system according to an embodiment of the present invention;

FIG. 2 an enlarged view of section II in FIG. 1;

Identical reference numbers subsequently designate similarly designed components or component areas.

FIGS. 1 to 16 show a profile system 1 according to a first embodiment of the present invention which has as main components a rail profile 2, a plug element 3, a load-bearing element 4 and a bath utensil 5 in the form of a holding bar.

Figures 1, 2:
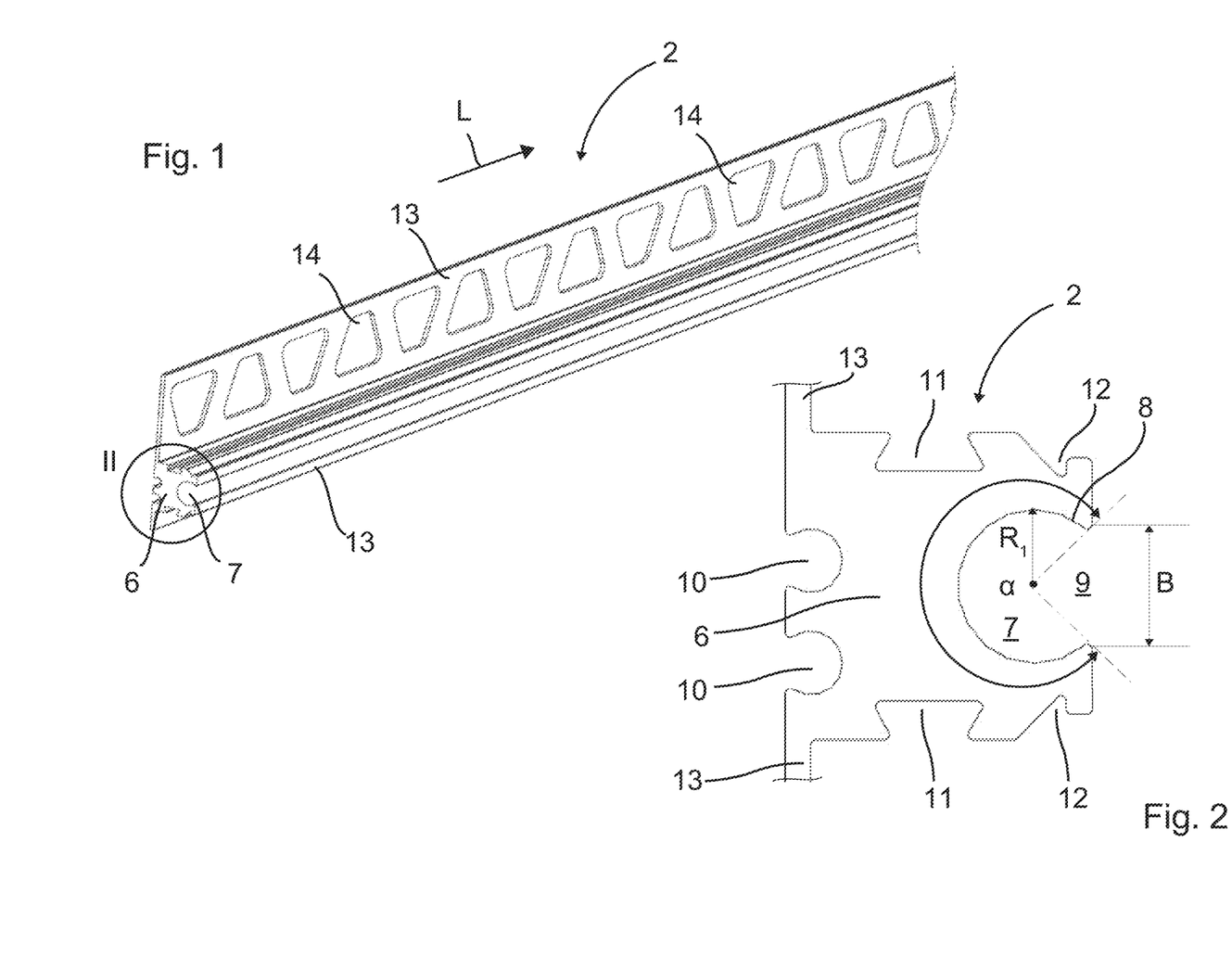

Rail profile 2 is an elongated rail profile extending in a longitudinal direction and having a constant cross-section, which is made of stainless steel. Alternatively, the rail profile 2 can also be made of aluminum or another material, such as plastic. The length of the rail profile 2 is normally 1000 to 3000 mm when delivered and can then be shortened to any length before mounting. The rail profile 2 comprises, viewed in cross-section, a substantially rectangular base section 6 which is provided at its front side with a receiving groove 7 extending in the longitudinal direction L. The receiving groove 7 describes a circular arc 8 with a first radius $R_1$ extending over an angle of at least 200°, presently about 270°, and is accessible via a groove opening 9 having a pre-determined groove width B. Undercut recesses 10, 11 are provided at the rear side, the upper side and the underside of the base section 6. The two recesses 10 provided at the rear side have the shape of a part of a circle when viewed in cross section. The recesses 11 at the upper side and the underside of the base section have a dovetail shape. In the corner areas between the underside and the front side, as well as between the front side and the upper side of the base section, undercut recesses 12 are provided defining a grout chamber. The rail profile 2 further comprises two fastening legs 13 which adjoin the rear side of the base section 6 substantially flush and protrude from the base section 6 upwards and downwards in opposite directions. Each of the fastening legs 13 is provided with a plurality of passage openings 14 which are substantially uniformly spaced apart from one another in the longitudinal direction, the uniform spacing not being mandatory.

Figures 3, 9:
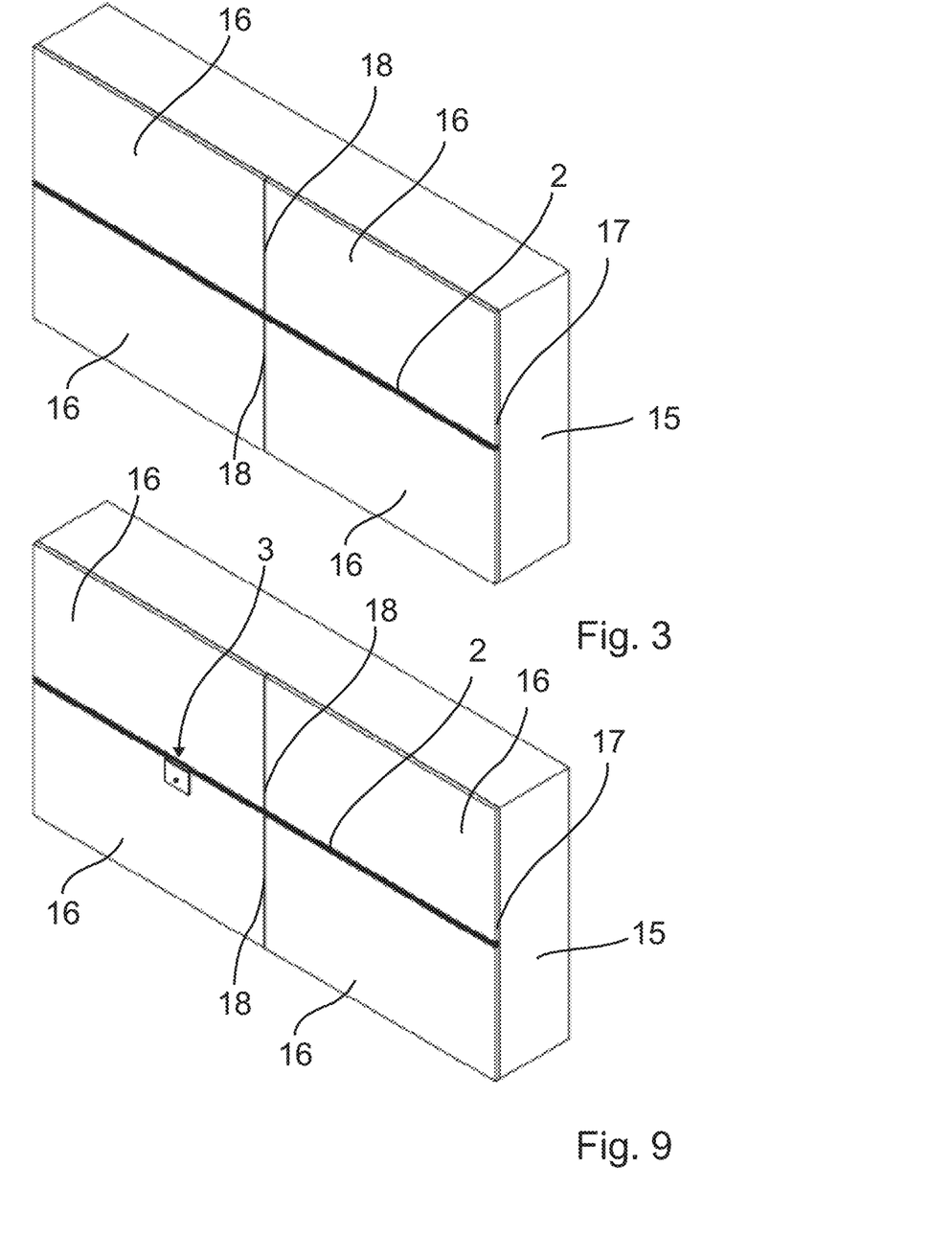
FIG. 3 a perspective view of the rail profile mounted on a wall.
FIG. 9 a perspective view analogous to FIG. 3 with the plug element fastened to the rail profile.

FIG. 3 shows the rail profile 2 when mounted on a wall 15. To achieve this condition, during the laying of tiles 16 on a wall 15, the rail profile 2 is installed in a horizontal joint between two rows of tiles arranged one above the other in such a way that the fastening legs are embedded in the tile adhesive 17 and the base section 6 is positioned in the joint in such a way that the side edges of the tiles 16 lie against the underside and the upper side of the base section 6. The tile adhesive 17 penetrates the passage openings 14 of the upper fastening leg 13 and anchors itself in the recesses 10 and 11, whereby a good fixing of the rail profile 2 to the wall 15 is achieved. In a further step grout 18 is applied and claws itself in the recesses 12 of the base section 6 of the rail profile 2.

Figure 4:
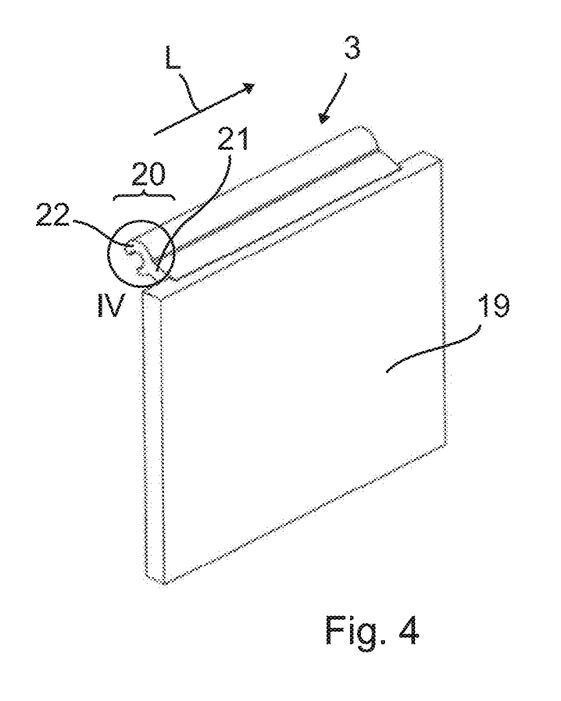
FIG. 4 a perspective view of a plug element of the profile system.
Figure 5:
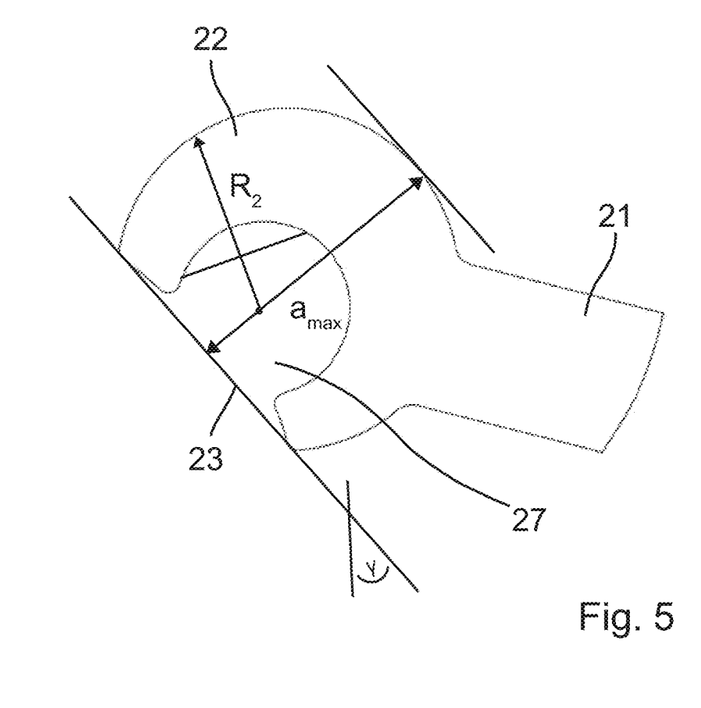
FIG. 5 an enlarged view of section IV in FIG. 4.
Figure 6:
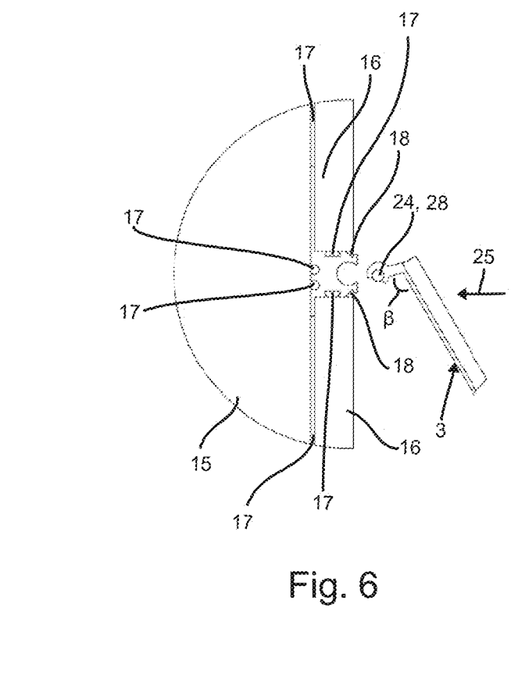
FIGS. 6-8 enlarged cross-sectional views showing how the plug element is fastened to the rail profile of the arrangement shown in FIG. 3.
Figure 7:
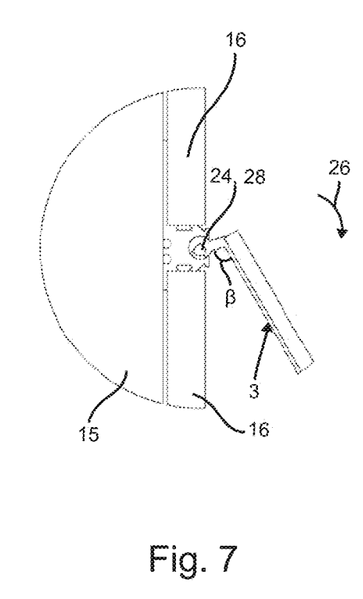
Figure 8:
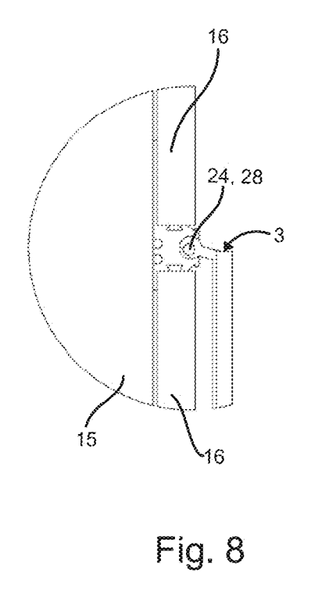

The plug element 3, which is shown in more detail in FIGS. 4 and 5, is also made of stainless steel. As with rail profile 2, other materials can also be used. The plug element 3 comprises a plate-shaped holding section 19 and an elongated connecting section 20 extending the longitudinal direction L attached thereto. The connecting section 20 has a bar 21 extending outwardly from the holding section 19 and a cylindrical head section 22 arranged at the free end of the bar 20, the circumferential surface of which, viewed in cross section, describes a circular arc having a radius $R_2$ which is equal to a radius $R_1$ or slightly, a few tenth of a mm, respectively, smaller than radius $R_1$. The maximum distance $a_{max}$ between a circular chord 23 delimiting the circular arc which extends in relation to FIG. 4 at an angle γ to the holding section 19, which preferably lies in the range from 35° to 60°, and the circumferential surface is slightly smaller than the groove width, so that the head section 22 can be inserted, as shown in FIG. 6, in a specific swivel position of the plug element 3 with respect to a swivel axis 24 extending in the longitudinal direction L, through the groove opening 9 into the receiving groove 7 of the rail profile 2 in the direction of the arrow 25 and, in the context of a swivel movement about the swivel axis in the direction of the arrow 26, can be locked within the receiving groove 7, see FIGS. 7 and 8. To facilitate the insertion of the head section 22 into the receiving groove 7, the bar 21 of the connection section 20 protrudes from the holding section 19 at an angle β from 100° to 110°. To achieve tolerance compensation in the state shown in FIG. 8, the head section is provided in the area of the circular chord 23 with the receiving deepening 27 extending in the longitudinal direction L, into which an elongated rubber lip 28 is inserted. The rubber lip 28 prevents the head section 22 from being moved too easily within the receiving groove 7. FIG. 9 shows the plug element in the state in which it is attached to the rail profile 2 of the arrangement shown in FIG. 3.

Figure 10:
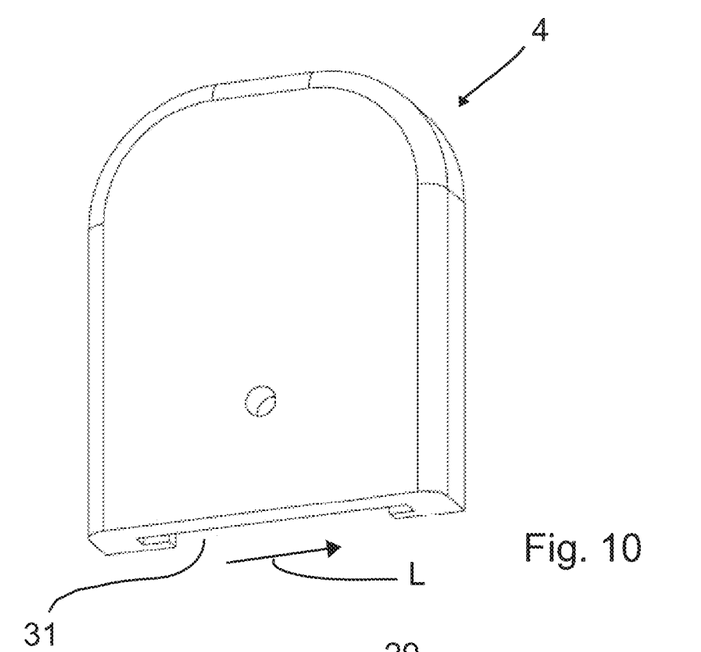
FIG. 10 a perspective front view of the load-bearing element of the profile system.
Figure 11:
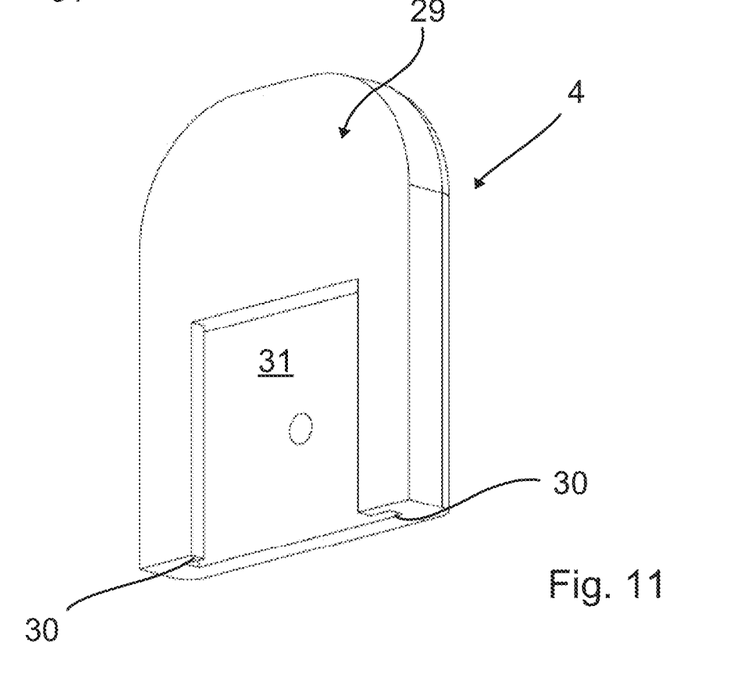
FIG. 11 a perspective rear view of the load-bearing element.
Figure 12:
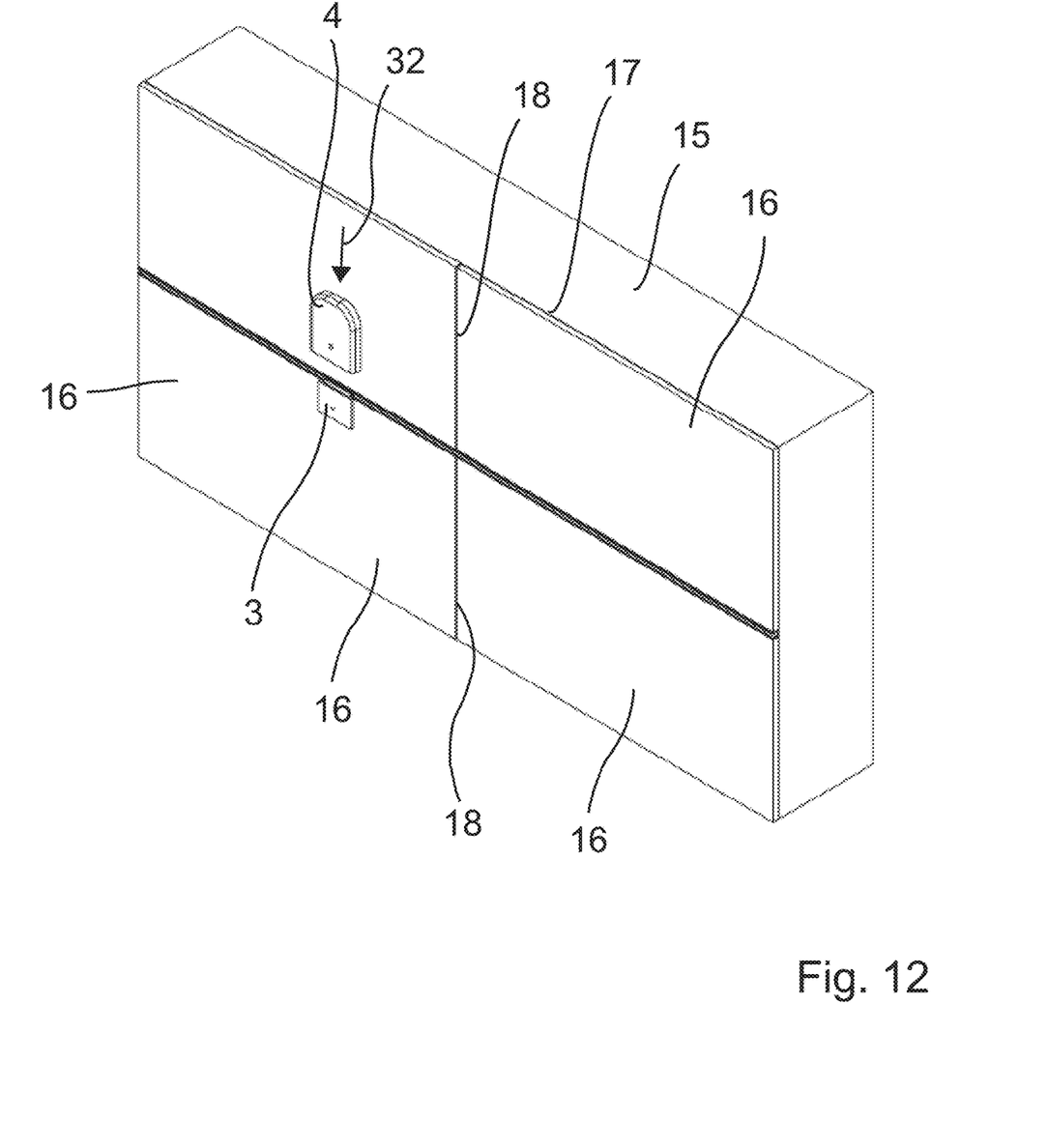
FIG. 12-14 perspective views analogous to FIG. 11, showing how a load-bearing element is fastened to the plug element.
Figure 13:
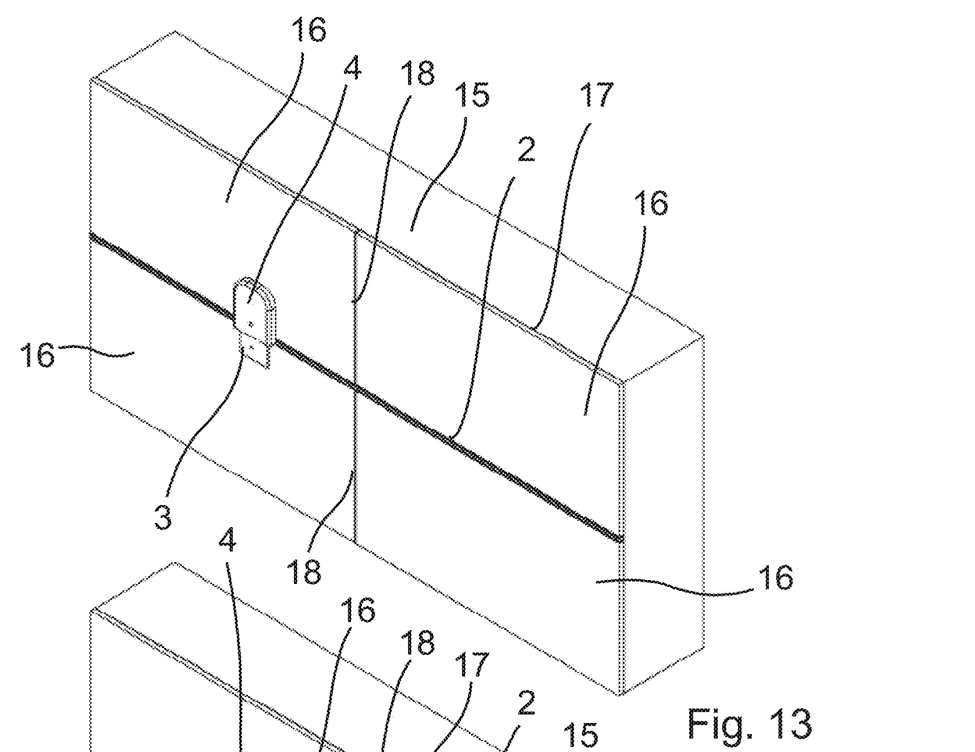
Figure 14:
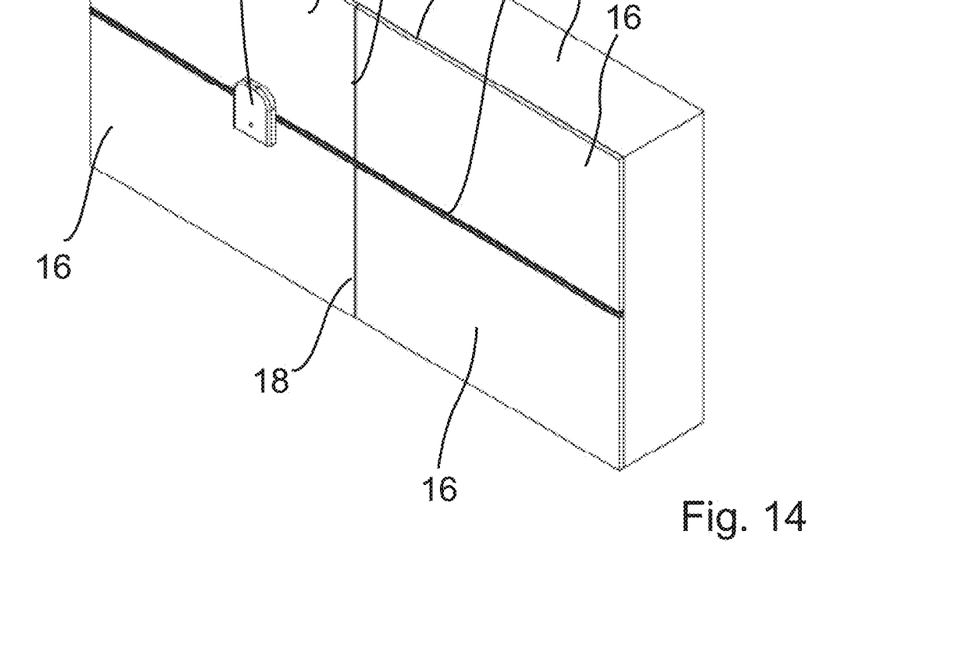

FIGS. 10 and 11 show the load-bearing element 4. This is in form of a plate and provided on its substantially flat rear side 29 with a groove 31 which is open at the bottom and closed at the top, has undercuts 30 laterally and the dimensions of which are adapted to the holding section 19 of the plug element 3 such that the load-bearing element 4 can be pushed from above in the direction of the arrow 32 in a form-fitting manner onto the locked holding section 19, as it is shown in FIGS. 13 and 14, and, in this pushed-on state, bears flat against the tiles 16.

Figure 15:
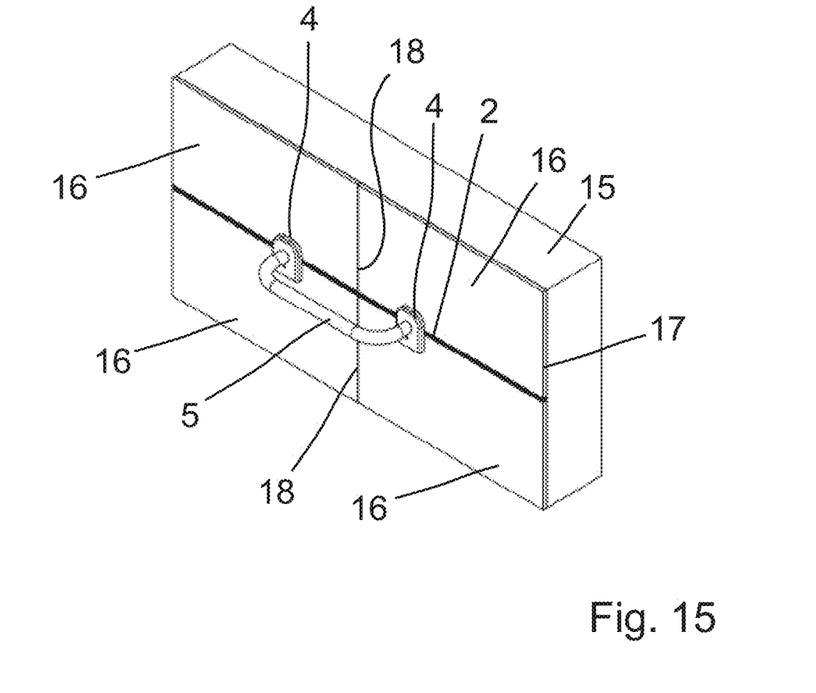
FIG. 15 a perspective view of a bath utensil in the form of a holding bar fastened to a wall.
Figure 16:
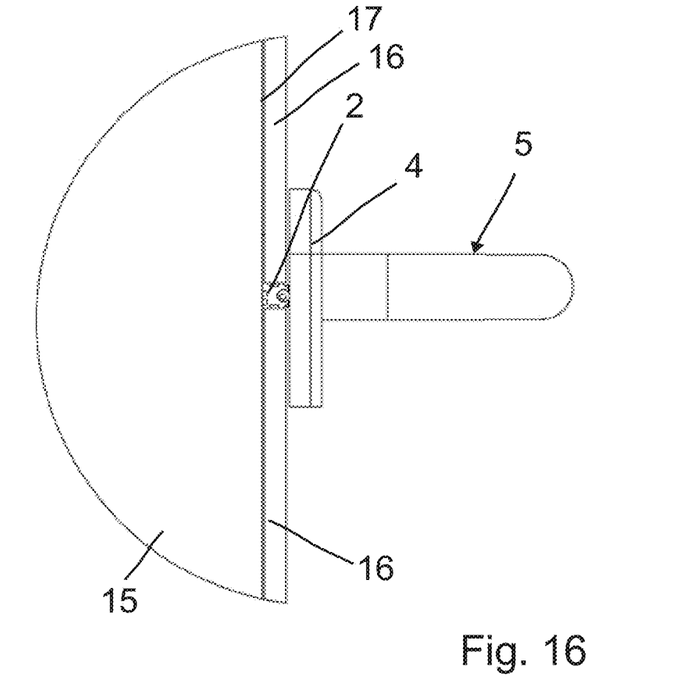
FIG. 16 an enlarged, partially cut side view of the arrangement shown in FIG. 15.

FIGS. 15 and 16 show an arrangement in which a bath utensil 5 in the form of a holding bar using two plug elements and two load-bearing elements 4 are fastened to a wall, the bath utensil 5 being fixedly connected to the two load-bearing elements 4.

Figure 17:
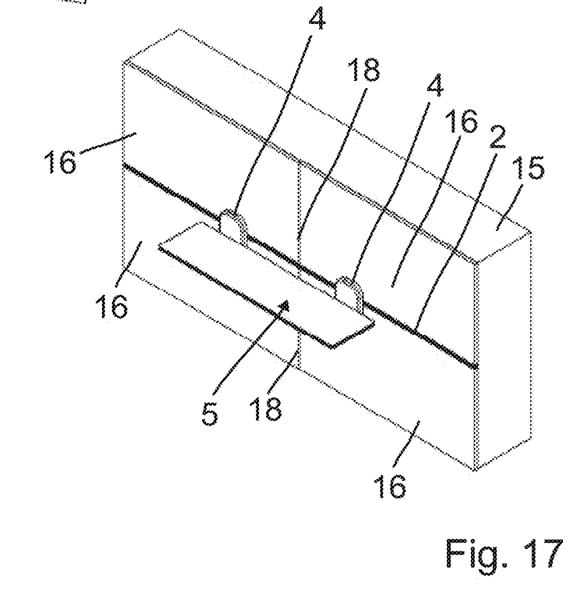
FIG. 17 a perspective view of a bath utensil in the form of a shower tray fastened to a wall.
Figure 18:
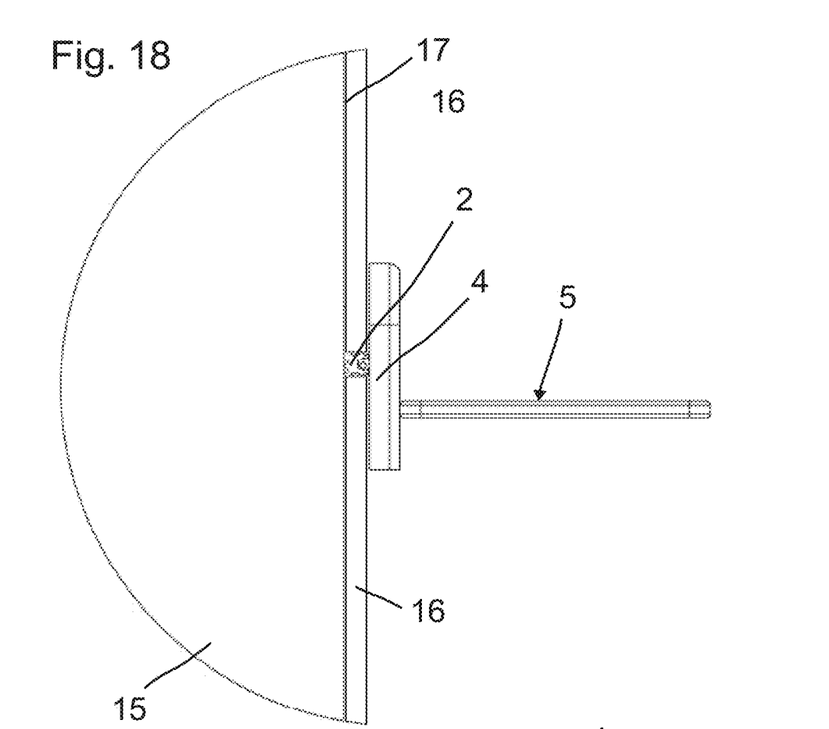
FIG. 18 an enlarged, partially cut side view of the arrangement shown in FIG. 17.

FIGS. 17 and 18 show an embodiment in which the bath utensil 5 is formed by shower tray.

Figure 19:
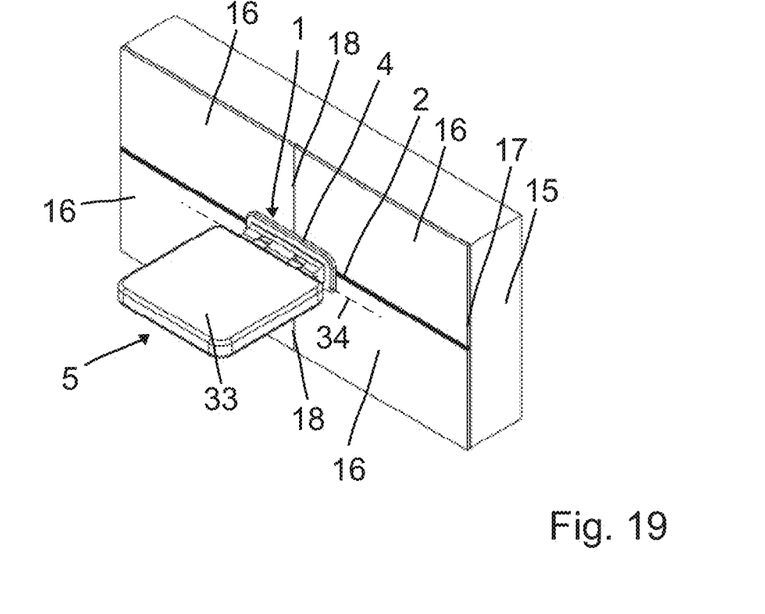
FIG. 19 a perspective view of a bath utensil in the form of a shower seat when opened fastened to a wall.
Figure 20:
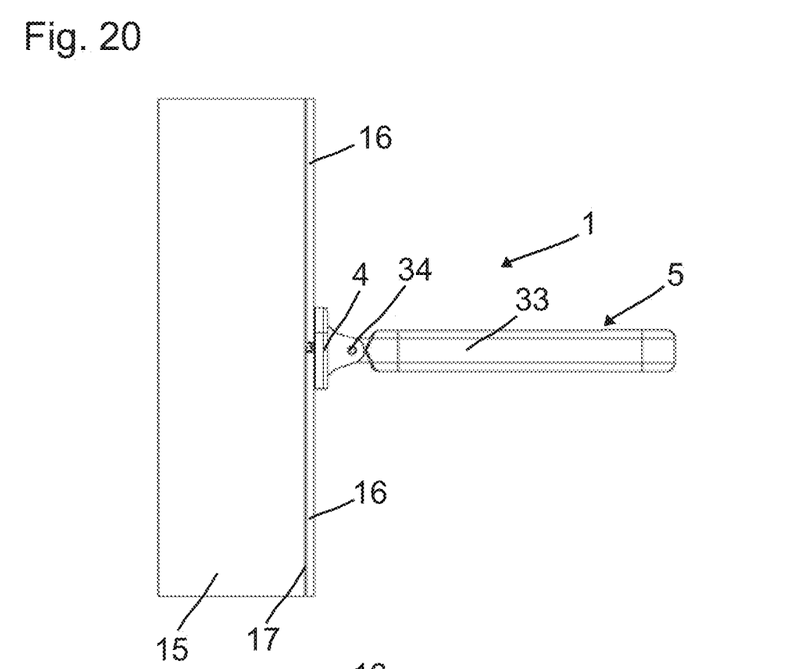
FIG. 20 an enlarged partially cut side view of the arrangement shown in FIG. 19.
Figure 21:
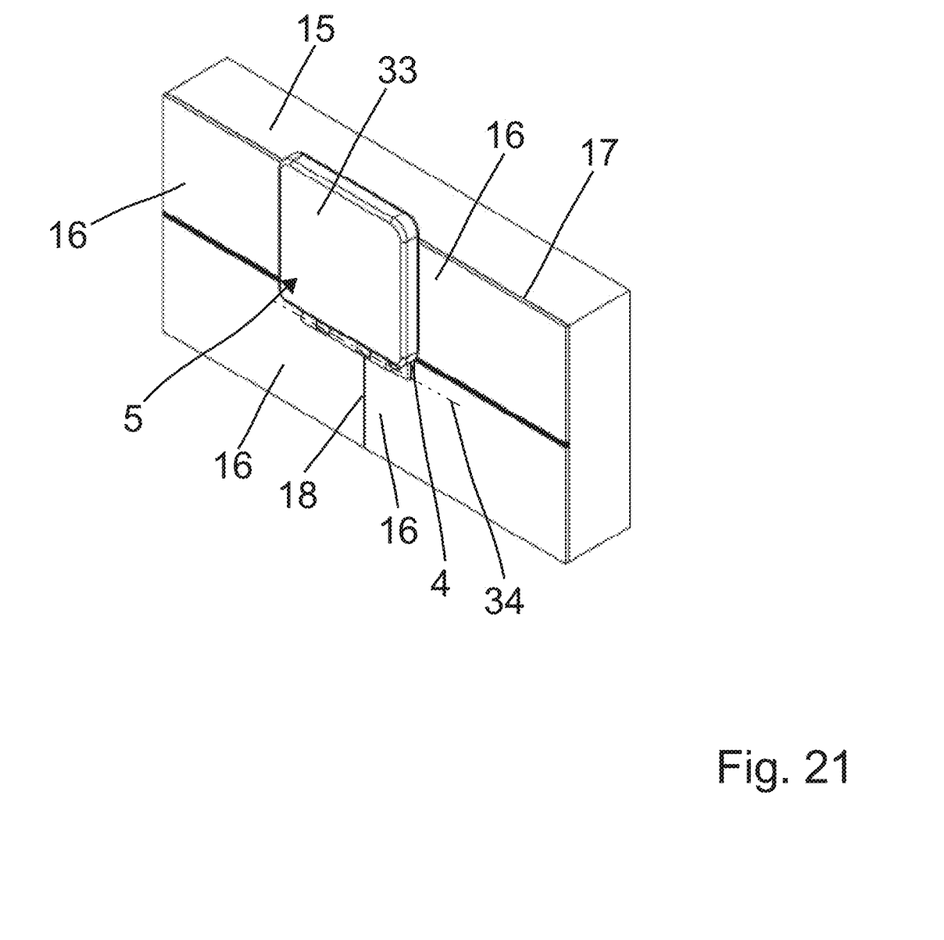
FIG. 21 a perspective view of the shower seat shown in FIG. 19 in the folded state.

In the embodiments shown in FIGS. 19 to 21 the bath utensil 5 is a shower seat. The shower seat comprises a seat section 33, which is attached to a load-bearing element 4 swivable about a swivel axis 34, so that the seat section 34 can be swiveled from the horizontal position shown in FIGS. 19 and 20 upwardly into the vertical position shown in FIG. 21, when not in use. The load-bearing element 4 comprises in this embodiment, even if not shown here, two grooves 31 and is pushed from above onto the holding sections 19 of the two plug-elements 3 fastened to the rail profile 2.

It should be clear that the above-described embodiments should only be taken as examples and in no way as restrictive. Rather, changes and modifications can be made to the embodiments without leaving the scope of protection defined by the enclosed claims.

REFERENCE NUMERALS

1 Profile system
2 Rail profile
3 Plug element
4 Load-bearing element
5 Bath utensil
6 Base section
7 Receiving groove
8 Circular arc
9 Groove opening 10 Recess
11 Recess
12 Recess
13 Fastening leg
14 Passage opening
15 Wall
16 Tile
17 Tile adhesive
18 Grout
19 Holding section
20 Connecting section
21 Bar
22 Head section
23 Circular chord
24 Swivel axis
25 Arrow
26 Arrow
27 Receiving deepening
28 Rubber lip
29 Rear side
30 Undercut
31 Groove
32 Arrow
33 Seat section
34 Swivel axis
L Longitudinal direction
B Groove width b width
$a_{max}$ Maximum distance
α, β, γ angle

I claim:

1. A profile system (1) for fastening objects to a room wall provided with a plate covering, comprising at least one elongated rail profile (2), which extends in a longitudinal direction (L) and has a constant cross-section, and at least one plug element (3), which is fastenable directly and detachably to the at least one elongated rail profile (2) in a plug-in manner, wherein the at least one elongated rail profile (2), viewed in cross-section, has a substantially rectangular base section (6), having a depth (T) corresponding to a thickness of the plate covering and which is provided on a front side of the substantially rectangular base section (6) with a receiving groove (7) extending in the longitudinal direction (L) with a groove opening (9) accessible from an outside, and at least one fastening leg (13) which adjoins a rear side of the substantially rectangular base section (6) substantially flush and projects outwards from the substantially rectangular base section (6), and wherein the at least one plug element (3) has a holding section (19), and an elongatedly formed connecting section (20) fastened to the holding section (19) and extending in the longitudinal direction (L), the connecting section (20) comprising at least one bar (21) extending outwards from the holding section (19) and a head section (22) arranged at the free end of the bar (21), the head section (22) being insertable through the groove opening (9) into the receiving groove (7) of the at least one elongated rail profile (2) in a first swivel position of the at least one plug element (3) with respect to a swivel axis (24) extending in the longitudinal direction (L) and is lockable by swiveling the at least one plug element (3) about the swivel axis (24) into a second swivel position within the receiving groove (7), wherein the profile system (1) comprises at least one load-bearing element (4) which, on a substantially flat rear side (29) of the at least one load bearing element, is provided with a groove (31) which is open at a bottom, closed at a top and has undercuts (30) laterally, dimensions of the groove (31) corresponding to the holding section (19) of the at least one plug element (3) in such a way that the at least one load-bearing element (4) can be pushed from above onto the holding section (19) in a form-fitting manner and bears flat against the plate covering, and a bath utensil (5) is fastened to a front side of the at least one load-bearing element (4).

2. The profile system (1) according to claim 1, wherein the receiving groove (7), viewed in cross-section, defines a circular arc (8) extending over at least 200° and having a first radius $R_1$, the groove opening (9) has a predetermined groove width (B) and the head section (22) has a substantially cylindrical circumferential surface, which, viewed in cross-section, defines a circular arc having a second radius $R_2$, which is equal to or smaller than the first radius $R_1$, a maximum distance ($a_{max}$) between a circular chord (23) delimiting the circular arc of the substantially cylindrical circumferential surface and the substantially cylindrical circumferential surface being smaller than the groove width (B).

3. The profile system (1) according to claim 1, further comprising undercut recesses (10, 11) provided on the rear side and/or on an upper side and/or on an underside of the substantially rectangular base section (6) of the at least one elongated rail profile (2).

4. The profile system (1) according to claim 1, further comprising a recess (12) with an undercut provided in a corner region between an underside and a front side of the substantially rectangular base section (6) and/or in a corner region between the front side and an upper side of the substantially rectangular base section (6) and/or in a corner region between the upper side and the rear side of the substantially rectangular base section (6), the recess defining a grout chamber.

5. The profile system (1) according to claim 1, wherein the at least one fastening leg (13) is provided with a plurality of passage openings (14), which are uniformly spaced apart from one another in the longitudinal direction (L).

6. The profile system (1) according to claim 1, wherein the at least one rail profile (2) and the at least one plug element (3) are made of metal, in particular of aluminum or stainless steel.

7. The profile system (1) according to claim 1, wherein the holding section (19) is plate-shaped.

8. The profile system (1) according to claim 1, wherein the at least one bar (21) of the connecting section (20) projects from the holding section (19) at an angle (P) in a range of 100° to 110°.

9. The profile system (1) according to claim 1, wherein the head section (22) is provided with a receiving deepening (27) extending in the longitudinal direction (L), into which a rubber lip (28) serving for tolerance compensation is inserted.

10. The profile system (1) according to claim 1, wherein the at least one load-bearing element (4) is made of metal or plastic.

11. The profile system (1) according to claim 1, wherein the bath utensil (5) is a holding bar, a shower seat, a towel holder or a shower tray.

\* \* \* \* \*